US008892061B2

(12) United States Patent
Beattie, Jr. et al.

(10) Patent No.: US 8,892,061 B2
(45) Date of Patent: Nov. 18, 2014

(54) METHODS, DEVICES, AND COMPUTER PROGRAM PRODUCTS FOR TRACKING RECEIPT AND DETERMINING EFFECTIVENESS OF RADIO BROADCAST SIGNALS

(75) Inventors: James Gordon Beattie, Jr., Bergenfield, NJ (US); Stephen J. Griesmer, Westfield, NJ (US); Shiv Kumar, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 473 days.

(21) Appl. No.: 13/070,538

(22) Filed: Mar. 24, 2011

(65) Prior Publication Data

US 2012/0244833 A1 Sep. 27, 2012

(51) Int. Cl.
*H03C 1/62* (2006.01)
*H04W 24/08* (2009.01)

(52) U.S. Cl.
CPC .................... *H04W 24/08* (2013.01)
USPC ....................... 455/115.3; 370/338

(58) Field of Classification Search
USPC ......................... 455/406; 370/338
See application file for complete search history.

(56) References Cited

U.S. PATENT DOCUMENTS

| | | | |
|---|---|---|---|
| 5,382,970 A | 1/1995 | Kiefl | |
| 5,794,157 A | 8/1998 | Haartsen | |
| 6,853,842 B1 | 2/2005 | Wilson et al. | |
| 7,689,236 B2 | 3/2010 | Matero et al. | |
| 7,756,464 B2 | 7/2010 | Uppala | |
| 7,805,160 B2 | 9/2010 | van Rooyen et al. | |
| 2004/0203717 A1 | 10/2004 | Wingrowicz et al. | |
| 2005/0119026 A1 | 6/2005 | Harano | |
| 2007/0130590 A1* | 6/2007 | Nash-Putnam | 725/63 |
| 2007/0157224 A1 | 7/2007 | Pouliot et al. | |
| 2007/0182585 A1* | 8/2007 | Mitsuhashi et al. | 340/902 |
| 2008/0102780 A1 | 5/2008 | Okamoto | |
| 2008/0108297 A1 | 5/2008 | Bettinger | |
| 2008/0108383 A1 | 5/2008 | van Rooyen | |
| 2009/0179989 A1 | 7/2009 | Bessone et al. | |
| 2010/0015911 A1* | 1/2010 | Reynolds | 455/2.01 |
| 2010/0069076 A1* | 3/2010 | Ishii et al. | 455/450 |
| 2010/0131642 A1 | 5/2010 | Chalikouras et al. | |
| 2010/0173602 A1 | 7/2010 | Muramatsu | |
| 2010/0259444 A1* | 10/2010 | Kosolobov et al. | 342/357.42 |
| 2011/0034180 A1* | 2/2011 | Walley et al. | 455/456.1 |
| 2012/0165015 A1* | 6/2012 | Gupta et al. | 455/436 |

* cited by examiner

*Primary Examiner* — Marcos Batista
(74) *Attorney, Agent, or Firm* — Parks IP Law LLC; Li K. Wang, Esq.

(57) ABSTRACT

Receipt of a radio broadcast signal by a mobile communication device is tracked based on a signal strength measurement signal and location information. The signal strength measurement signal indicate a signal strength of the radio broadcast signal, received via a communication channel and measured at the mobile communication device, over a particular time period. The location information indicates a location of the mobile communication device within a geographic area over the particular time period. Effectiveness of the radio broadcast signal is determined with respect to receipt of the radio broadcast signal by a plurality of mobile communication devices within the geographic area over the particular time period.

20 Claims, 4 Drawing Sheets

METHODS, DEVICES, AND COMPUTER PROGRAM PRODUCTS FOR TRACKING RECEIPT AND DETERMINING EFFECTIVENESS OF RADIO BROADCAST SIGNALS

TECHNICAL FIELD

The present disclosure relates generally to telecommunications, and, more particularly, to tracking radio broadcast signal reception.

BACKGROUND

The receipt and effectiveness of radio broadcasts are typically hard to track and determine. Conventionally, the extent to which radio broadcasts are received is measured via estimation or plotting through field measurement. This is typically a manually intensive task, and the accuracy of such measurements may vary with changes to the environment in which the signals are broadcast, such as by construction modifying the landscape or seasonal or weather-related impacts.

The effectiveness of radio broadcasts is currently determined by assessing a listenership of the radio broadcasts. This is currently done by telephone polling, manual log maintenance, or through personal viewer data collection devices. Each of these has various limitations with regard to timeliness, completeness, accuracy, and cost.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an exemplary embodiment a method for tracking receipt of a radio broadcast signal includes receiving, from a mobile communication device, a signal strength measurement signal indicating signal strength of the radio broadcast signal received at the mobile communication device via a communication channel over a particular time period and receiving location information indicating a location of the mobile communication device within a geographic area over the particular time period. The received signal strength of the radio broadcast signal within the geographic area over the particular time period is tracked based on the received signal strength measurement signal and the received location information.

According to another embodiment, a system for tracking receipt of a radio broadcast signal includes an input and a processor. The input is configured to receive, from a mobile communication device, a signal strength measurement signal indicating signal strength of the radio broadcast signal received at the mobile communication device via a communication channel over a particular time period. The input is also configured to receive location information indicating a location of the mobile communication device within a geographic area over the particular time period. The processor tracks the received signal strength of the radio broadcast signal within the geographic area over the particular time period based on the received signal strength measurement signal and the received location information.

According to another embodiment, a computer program product includes a storage medium upon which instructions are recorded that, when executed by a processor, perform a method for tracking receipt of a radio broadcast signal. The method comprises receiving, from a mobile communication device, a signal strength measurement signal indicating signal strength of the radio broadcast signal received at the mobile communication device via a communication channel over a particular time period and receiving location information indicating a location of the mobile communication device within a geographic area over the particular time period. The method further comprises tracking the received signal strength of the radio broadcast signal within the geographic area over the particular time period based on the received signal strength measurement signal and the received location information.

DETAILED DESCRIPTION

Figure 1:
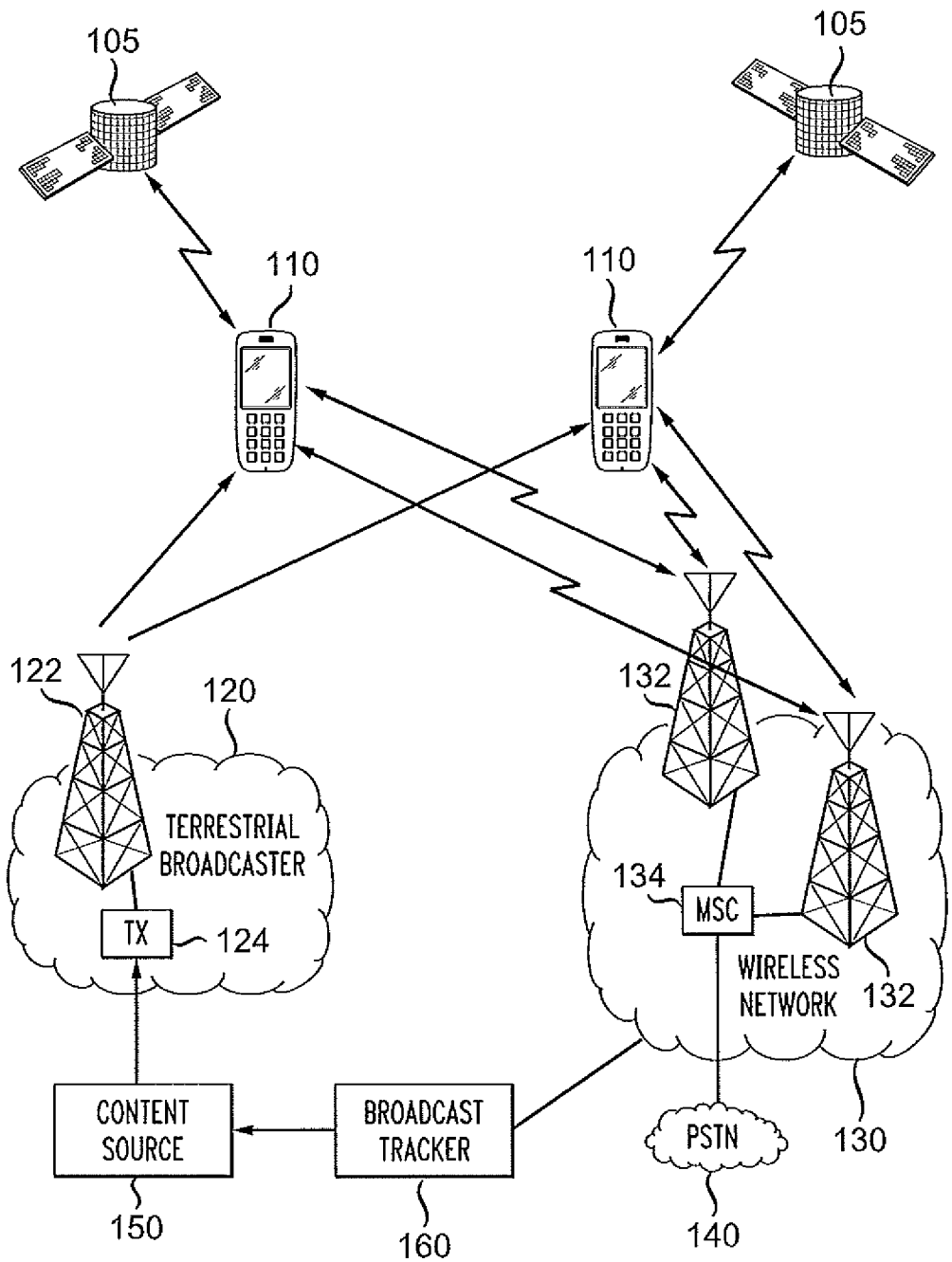
FIG. 1 illustrates a communications environment in which receipt of radio broadcast signals is tracked and the effectiveness of the radio broadcast signals is determined according to an exemplary embodiment.

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

A trend is emerging to include FM radio and other radio broadcast capabilities outside the cellular radio frequency range into mobile communication devices employing cellular radio capabilities. Such capabilities would enable emergency alert broadcasting and regular radio program broadcasting to be provided to mobile communication devices over radio frequencies outside the cellular radio frequency range. Signals provided by way of such radio frequencies outside the cellular radio frequency range may include audio signals transmitted via, e.g., FM, AM, and satellite radio (e.g., Sirius/XM radio) bands, and video signals, transmitted via, e.g., VHF, UHF, and private video bands. Additional content may be provided on subcarriers of the radio bands.

According to exemplary embodiments, the receipt of radio broadcast signals by mobile communication devices at various locations within a geographical area may be tracked over a particular time period, e.g., at a particular moment in time, over a number of hours, over a number of days, etc., to provide current and/or cumulative information over time indicating how well the broadcast signal is being received at various locations. This tracking may be used to meet regulatory constraints and enable enhancements to the radio broadcast coverage area that would otherwise not be possible.

According to exemplary embodiments, the receipt of radio signal broadcasts by mobile communication devices may be tracked in terms of the received signal strength and location of the mobile communication devices, and effectiveness of the radio signal broadcasts is determined with regard to the location and density of the listener, listenership of a given program, effectiveness of advertising, etc. As used herein, the term "listener" includes not only users listening to audio broadcasts but also viewers of video broadcasts. Other useful information, such as listener demographics, may also be tracked. This information may be provided to a source of broadcast content, such as an advertiser.

Additional benefits include enhanced physical device performance tracking and public interest tracking of broadcast content and/or receptiveness of listeners to a product or service being advertised via a radio broadcast signal. By providing feedback to a content source, such as a commercial sponsor advertising products and/or services via radio broadcast, improved value can be delivered to the sponsor, reducing costs to the sponsor in sponsoring programs from which little value is derived and increasing revenue to the sponsor in sponsoring programs which yield high value.

Additional information may be provided to a broadcast content source, such as an advertiser, to aid the advertiser in determining what products or services to advertise to a particular listener base (including multiple listeners) in a particular geographical area. For example, a summary of the size and composition of monthly mobility accounts, collective credit history, and routing information for particular mobile subscribers may be tracked and provided to the content source. Such information provides a profile of the financial capabilities of the listener base in various geographic areas and guides advertisers in what products or services to advertise for and what broadcast programs to sponsor.

As an illustrative example, consider an advertiser desiring to sell cars in two adjacent cities. The advertiser may desire information regarding the kinds of mobile communication devices used by listeners in those areas, along with the extent of device usage, and the payment profiles of the device users for the listener base in each city. This information may serve as a gauge for the advertiser to determine likely interest and capability of the listeners in a particular city with regard to buying a particular car.

Further, according to exemplary embodiments, receipt of radio broadcast signals from various radio stations, television stations, and other radio broadcast providers having a similar program format may be tracked, so that advertisers may broadcast the same advertisements targeted to listeners of particular programs from those broadcast stations. Thus, as mobile communication devices move from one geographical area to another, the users of those devices tuning into particular broadcast stations continue to receive broadcasts including the advertisement. This may be particularly important for advertising to listeners, traveling from one area to another, about a special event, or for providing public service announcements, e.g., weather alerts, to listeners.

According to exemplary embodiments, a tendency of a listener to continue to listen to particular a broadcast program or change to a different broadcast program, referred to as a relative stickiness of the listener to the broadcast, may also be tracked by capturing channel changes that occur by listeners, of the listener, when a radio broadcast program changes, e.g., switches to a different song, television show, or commercial. This information may be used, along with other information provided by the mobile communication devices, to enable broadcast station program directors to improve their broadcast offerings. By doing this the program directors may focus broadcast content on certain listener bases which, in turn, increases advertising revenue for the broadcast station.

According to exemplary embodiments, broadcast content may be augmented with additional information, such as news provided by news organizations. Providers of such augmented content may also benefit from information regarding the tracked receipt of broadcast radio signals and the determined effectiveness of the radio broadcast signals, in terms of assisting such providers in determining what content to provide to augment regular radio broadcast from radio broadcast stations.

FIG. 1 illustrates a communications environment in which the receipt of radio broadcast signals may be tracked and the effectiveness of such radio broadcast signals may be determined according to an exemplary embodiment. The environment includes a terrestrial network 120 and a wireless network 130, both of which are in communication with mobile communication devices 110. The mobile communication devices 110 receive one-way radio broadcast signals outside the cellular radio frequency range from the terrestrial network 120. The mobile communication devices 110 communicate bi-directionally with the wireless network 130, receiving and transmitting radio broadcast signals and other signals over the cellular radio frequency range.

The radio frequency range, as that terminology is used herein, may be considered to refer to that part of the electromagnetic spectrum corresponding to radio frequencies lower than around 300 GHz. The cellular radio frequency range, as this terminology is used herein, may be considered that portion of the radio spectrum over which bi-directional communication between the mobile communication devices and the wireless network 130 occurs. The radio frequencies used for cellular radio communication are set by standards bodies, including, for example, the Research and Development Center for Radio Communications (RCR) and the Telecommunications Technology Committee (TTC) from Japan, the European Telecommunications Standards Institute (ETSI), the T1 committee, the Telecommunications Industries Association (TIA) committee and the Joint T1 and TIA committee (JTC) of the U.S., and the TTA (Telecommunications Technology Association) of Korea. The cellular radio frequencies vary among network types and regions across the world. Though the cellular radio frequency range depends on the type of network wireless used for communication and the region of the world in which the network is implemented, the cellular radio frequency range includes various frequencies within the 400-500 Hz range, the 700-900 Hz range, and the 1700-2400 Hz range. It should be appreciated that these frequency ranges are given by way of example only, and the cellular radio frequency range may change as radio frequency bands are reallocated for use with emerging technology.

The mobile communication devices 110 may receive radio broadcast signals from the terrestrial network 120 at the same time that the devices 110 are in communication with the wireless network 130. Although only one terrestrial network 120 and one wireless network 130 are shown, it should be appreciated that the present disclosure is applicable to any number of terrestrial and wireless networks.

The mobile communication devices 110 may include, for example, mobile phones, portable computers with integrated, external, or removable network access cards, etc. Details of an exemplary mobile communication device 110 are described below with reference to FIG. 2.

The terrestrial network 120 may include a transmitter 124 for receiving content from a content source 150 and an antenna 122 for transmitting such content. Together, the transmitter and the antenna 122 may be considered a radio broadcast station. Although not shown in the interest of simplicity of illustration, the terrestrial broadcast network 120 may also include other components, e.g., a multiplexer for multiplexing various content from a content source 150 as well as additional sources, an encryptor for encrypting content, etc. The terrestrial broadcast network 120 may be implemented with components for transmitting radio signals in radio frequency ranges including but not limited to FM, AM, VHF, UHF, satellite radio, private video, etc.

The wireless network 130 may be implemented according to exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

The wireless network 130 may include various components, such as base transceiver stations (BTS) 132 for communicating with the mobile communication devices 110. Although not illustrated for the sake of simplicity of illustration, it should be appreciated that the wireless network 130 includes various other components, e.g., a base station controller or radio network controller for allocating radio resources, administering frequencies, and controlling handovers between BTS 132.

The wireless network 130 may also include a mobile switching center (MSC) 134 is configured to function as a telecommunications switch. The MSC 134 may also be in communication with location databases, such as a visiting location register configured to store all subscriber data that is required for call processing and mobility management for mobile subscribers that are currently located in an area controlled by the visitor location register, and a home location register that is configured to provide routing information for mobile terminated calls and various messaging communications. The wireless network 130 may be connected to landline networks, e.g., the Public Switched Telephone Network (PSTN) 140, and/or other networks.

The content source 150 may be implemented with a server including a database and a transceiver. Content provided by the content source 150 may include audio, video, multimedia content, etc. The content source 150 may include, e.g., an advertising entity, an emergency information broadcast entity, a public announcement information entity, etc. The content source 150 may be an entity distinct from a radio broadcast station, as illustrated in FIG. 1. In addition or alternatively, a content source may also be included within or closely associated with the radio broadcast station. Further, although one content source 150 is shown in FIG. 1 for simplicity of illustration, it should be appreciated that any number of content sources may be used.

According to an exemplary embodiment, sources of augmented content, such as news organizations, may also provide content to be broadcast by the radio broadcast station. This augmented content may be provided via a radio channel subcarrier. A program guide, which may be displayed on the mobile communication devices 110, may be provided in this manner. An analog or digital subcarrier channel may be used to broadcast even more content, e.g., a news program or a promotional stream. A subcarrier receiver may be provided in the mobile communication device 110 for this purpose.

According to an exemplary embodiment, location information from a location-determining system, e.g., a GPS system including antennas 105, is provided to the mobile communication devices 110, which in turn, provide the location information to the broadcast tracker 160 via, e.g., the wireless network 130. Location data may be derived, e.g., from a GPS receiver in the mobile communication device 110. As an alternative, location data for the mobile communication devices may be derived and provided to the broadcast tracker via base station or cell site triangulation. Although the description below is directed to a GPS system, it should be appreciated that any type of location-determining system may be used.

Radio signals broadcast from the terrestrial network 120 are received by the mobile communication devices 110, and the mobile communication devices 110 measure the signal strength of the received radio broadcast signals. The received signal strength may be reported by the mobile communication devices 110 to the broadcast tracker 160 via the wireless network 130. The received signal strength measured by each mobile station 110 may be reported as a value, e.g., a received signal strength indicator (RSSI), via a message, e.g., a network measurement report, to a BTS 132 of the wireless network 130. The measured signal strength may, in turn, be relayed to the broadcast tracker 160.

The mobile communication devices 110 may also determine their respective locations within a geographical area and report their locations to the broadcast tracker 160 via the wireless network 130. Alternatively, the locations of the mobile communication devices 110 may be determined based on the reported received signal strength or by any other suitable location-determining method. In one embodiment, the broadcast tracker 160 receives the location information for the mobile communication devices 110 from a location database, such as a home location register or a visitor location register in the wireless network 130.

The signal strength measurements and the location information may be communicated to the broadcast tracker 160 via the wireless network 130. Based on the signal strength measurements and the location information, the broadcast tracker 160 tracks the receipt of the radio broadcast signals and determines the effectiveness of the radio broadcast signals, This is described in more detail below with reference to FIG. 3.

According to exemplary embodiments, location information and/or radio signal strength measurements may be reported in near-real time from the mobile devices 110 to the broadcast tracker 160 via the wireless network 130. Alternatively, the location information and/or the received signal strength measurements may be stored in the mobile communication devices 110 and reported to the broadcast tracker 160 at a later time, e.g., if the mobile communication devices 110 are not within range of the wireless network 130.

According to an exemplary embodiment, the broadcast tracker 160 reports the information regarding the receipt and effectiveness of the broadcast signal, e.g., to the content source 150. Thus, the content source 150 is provided with information regarding the effectiveness of its broadcasting via the terrestrial network 120. Although one content source 150 is shown for ease of illustration, it should be appreciated that any number of content sources may provide content for broadcast. The content source 150 may include, e.g., an advertising entity, an emergency information broadcast entity, a public announcement information entity, etc. The broadcast tractor 160 may also provide information regarding receipt and effectiveness of the broadcast signal to a source other than the content source 150, e.g., a government agency monitoring receipt of radio broadcast signals.

The broadcast tracker 160 may be implemented as a distinct element in communication with the wireless network 130 or be implemented as part of the wireless network 130. The broadcast tracker 160 may be provided by a service provider of the wireless network 130 or by a third party.

According to an exemplary embodiment, tracking the specific location of the listener base over a particular time period, e.g., at a particular moment in time, over a number of hours, over a number of days, etc., enables feedback to be provided to the content source 150 and allows for a documented listenership which, in turn, allows for listener-based billing for advertising. Further, if a listener dials a phone number, accesses a web site, or texts to a specific advertiser, that transaction can be captured by the mobile communication device 110 and forwarded to the content source 150 to further enhance listener-based billing for advertising. In order to maintain privacy, the specific listener identity may be hidden, e.g., by the broadcast tracker 160 or a mediation system operated by a service provider of the wireless network 130 that would shield subscriber specifics from the broadcast content source and maintain the anonymity of the broadcast listener.

Figure 2:
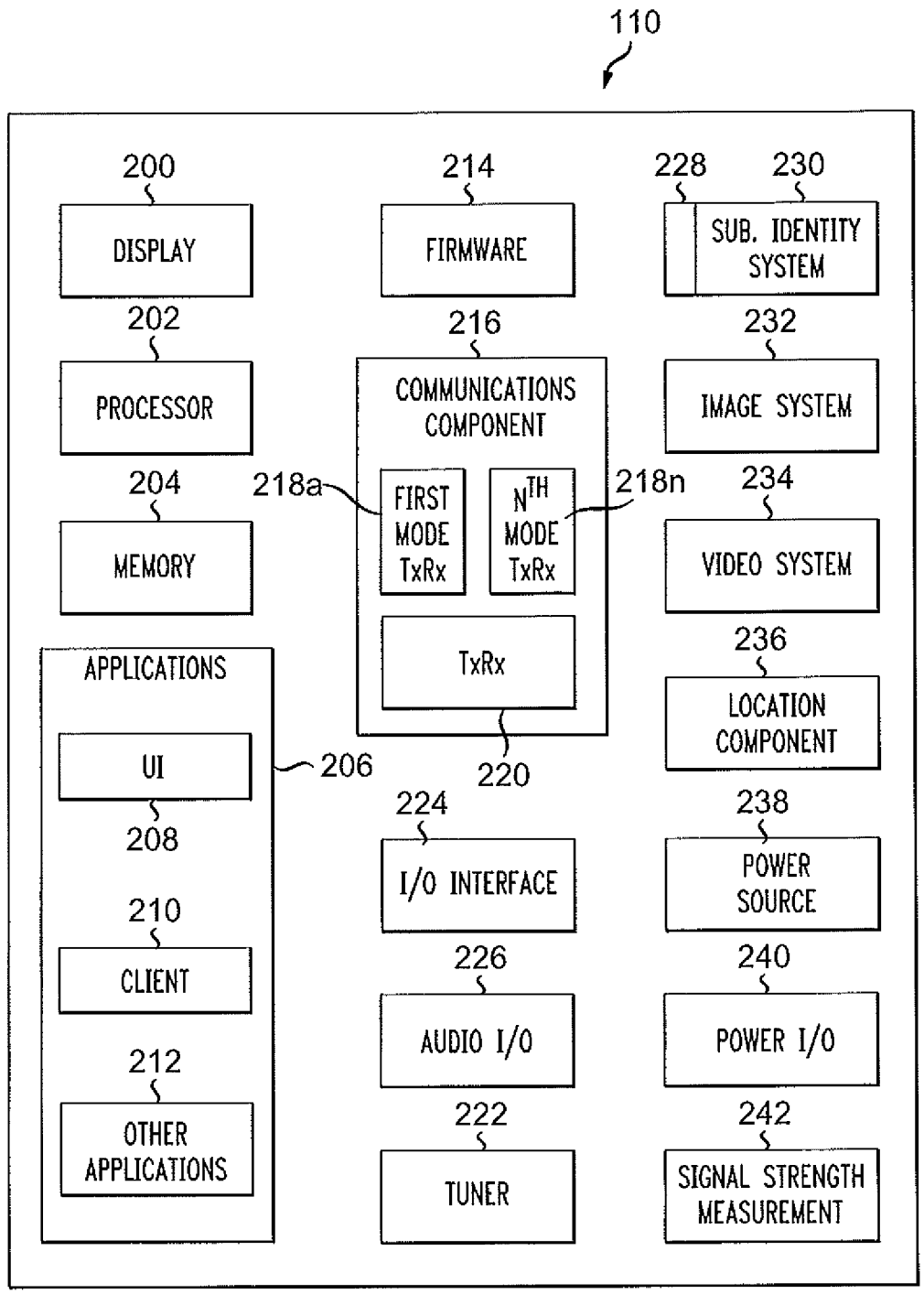
FIG. 2 illustrates a mobile communication device for receiving radio broadcast signals according to an exemplary embodiment.

FIG. 2 illustrates a schematic block diagram of an exemplary device 110 according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software. The term "application", or variants thereof, s used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200 for displaying multimedia, such as, for example, text, images, video, and telephone functions, such as Caller ID data, setup functions, menus, music metadata, messages, wallpaper, graphics, Internet content, device status, preference settings, and the like. The display 200 may also display received television signals, including signals received via, radio, internet, and satellite, as well as augmented program content, e.g., program guides.

The device 110 may include a processor 202 for controlling and/or processing data. A memory 204 can interface with the processor 202 for the storage of data and/or applications 206. The applications 206 may include, for example, SMS messaging software, EMS message software, MMS messaging software, USSD software, a WAP browser, and the like.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components. The applications 206 may also include a user interface (UI) application 208. The UI application 208 can interact with a client 210 (e.g., an operating system) to facilitate user interaction with device functionality and data, for example, entering message content, viewing received messages, answering/initiating calls, entering/deleting data, password entry and settings, configuring settings, address book manipulation, and the like. Such user interaction may be facilitated via, e.g., a keypad or a touchscreen included in the device 110 or communicating with the device via the I/O interface 224.

The applications 206 can be stored in the memory and/or in firmware components 214 and can be executed by the processor 202. The firmware 214 can also store code for execution during initialization of the device 110.

A communications component 216 may interface with the processor 202 to facilitate wired/wireless communication with external systems including, for example, cellular networks and terrestrial broadcast networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can include a multimode communication subsystem for providing cellular communications via different cellular technologies. For example, a first cellular transceiver 218a can operate in one mode, for example, GSM, and an Nth transceiver 218n can operate in a different mode, for example UMTS. While only two transceivers 218a, 218n are illustrated, it should be appreciated that a plurality of cellular transceivers may be included.

The communications component 216 also includes a transceiver 220 for other communication technologies, such as, for example, WIFI, WIMAX, BLUETOOTH, infrared, IRDA, NFC, and the like. The transceiver 220 may include a tunable RF receiver for receiving radio broadcast signals in the radio frequency range that are outside the cellular radio range. These signals may include, FM, AM, UHF, VHF and XM signals. The transceiver 220 may also include a subcarrier receiver, e.g., a subsidiary carrier authorization (SCA) receiver, for receiving augmented content broadcast via a radio frequency subcarrier.

The communications component 216 may facilitate reception from terrestrial radio networks, digital satellite radio networks, Internet based radio service networks, combinations thereof, and the like. The communications component 216 can also process data from a network, such as, for example, the network 120, the Internet, a corporate network, a home broadband network, a WIFI hotspot, and the like via an ISP, DSL provider, or broadband provider.

The device 110 may communicate with the wireless network 130 via the transceivers 218a-218n independently of the broadcast received via the transceiver 220. Thus, radio signal broadcasts may be received via the transceiver 220 even if the device is not within the range of a wireless network 130, and wireless network communication may occur via the transceivers 218a-218n even if the device 110 is not within range of the terrestrial broadcast network 120. Also, radio broadcasts from the terrestrial network 120 may be received at this same time as cellular communication with the wireless network 130.

A tuner 222 may be included to select radio frequency bands to receive the transceiver 220. For example, the tuner may tune to FM, AM, UHF, VHF, XM bands. The frequency tuned to at certain times may also be reported by the mobile communication device 110 to the broadcast tracker 160 via the appropriate transceiver 218a-218n and the wireless network 130. This information may be used to determine the relative stickiness of the listener, as described above.

An input/output (I/0) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals and a microphone to collect audio signals. The device 110 can include a slot interface 228 for accommodating a subscriber identity system 230 such as, for example, a subscriber identity module (SIM) or universal SIM (USIM). The subscriber identity system 230 instead can be manufactured into the device 110, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 110 can further include an image capture and processing system 232 (image system). Photos and/or videos can be obtained via an associated image capture subsystem of the image system 232, for example, a camera. The device 110 may also include a video system 234 for capturing, processing, recording, modifying, and or transmitting video content.

A location component 236 may be included to send and/or receive signals such as, for example, GPS data, A-GPS data, WIFI/WIMAX and or cellular network triangulation data, combinations thereof, and the like. The location component 236 can interface with cellular network nodes, telephone lines, and satellites, such as satellites 105, location transmitters and/or beacons, wireless network transmitters and receivers, for example, WIFI hotspots, radio transmitters, combinations thereof and the like. The device 110 may obtain, generate, and/or receive data to identify its location or can transmit data used by other devices to determine the device 110 location. The location of the device 110 can be provided to the broadcast tracker 160 via the transceivers 218a-218n and the wireless network 130 and used by the broadcast tracker 160 to track the receipt of radio broadcast signals across geographical regions at a given time.

The device 110 may also include a power source 238, such as batteries and/or other subsystems (AC or DC). The power source 238 can interface with an exemplary power system or charging equipment via a power I/O component 240.

According to an exemplary embodiment, the mobile communication device 110 may be passively turned on and off, and receipt of radio broadcast signals may be passively monitored. As an alternative, information may be sent to the mobile communication devices 110 via, e.g., a text message or a voice mail, indicating that a radio broadcast will be sent at a certain time, and a user of the mobile communication device 110 may respond by turning on the device 110, or the device may be automatically turned on to receive the broadcast signal.

The received signal strength of the radio broadcast signals from the terrestrial network 120 may be measured by a signal strength measurement component 242 and reported to the broadcast tracker 160 via the transceivers 218a-218n in communication with the wireless network 130. The signal strength measurement component 242 may be implemented with any suitable component for measuring signal strength, e.g., an S signal strength measurement component.

Figure 3:
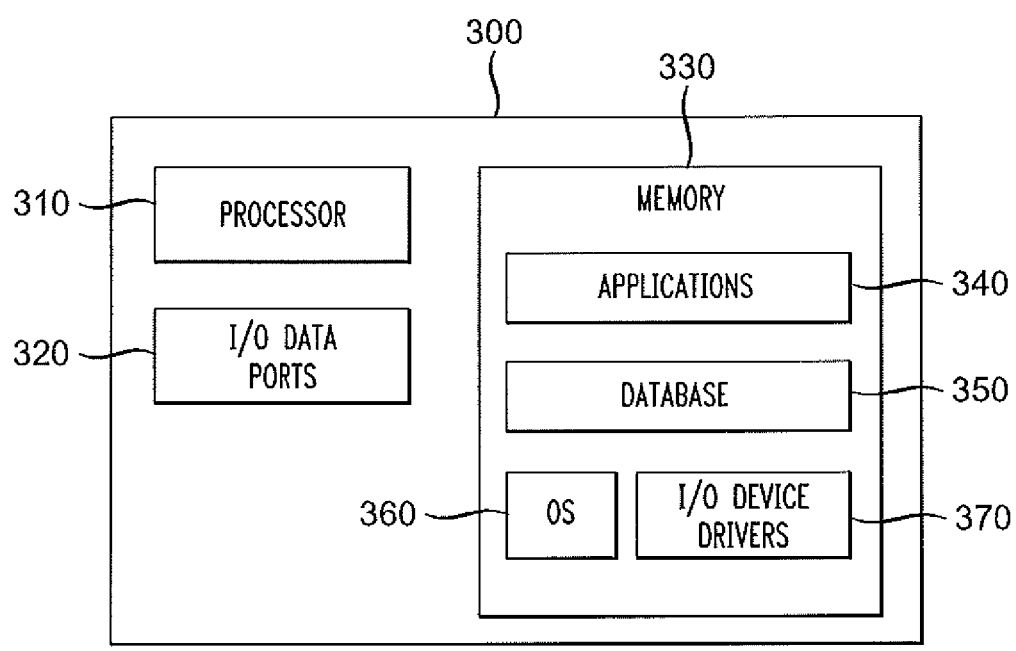
FIG. 3 illustrates a system for tracking the receipt and determining the effectiveness of radio broadcast signals according to an exemplary embodiment.

FIG. 3 is a block diagram of a system for tracking receipt and determining effectiveness of a radio broadcast signal according to an exemplary embodiment. The device 300 includes a processor 310 that receives information, such as signal strength measurements and location information received from mobile communication devices 110 via, e.g., the wireless network 130 and the I/O Data Ports 320. The I/O Data Ports 320 can be implemented with, e.g., an interface including an antenna or other suitable type of transceiver through which data and signals may be transmitted and received. It should be appreciated that the I/O Data Ports 320 can be used for communications with, e.g., a radio broadcast content source 150, the wireless network 130, etc.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including tracking receipt and determining effectiveness of radio broadcast signals based on received signal strength information and location information from mobile communication devices 110. The applications 340 may be applied to data stored in the database 350, along with data, e.g., received via the I/O data ports 320. The database 350 represents the static and dynamic data used by the applications 340, the OS 360, the I/O device drivers 370 and other software programs that may reside in the memory.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

Figure 4:
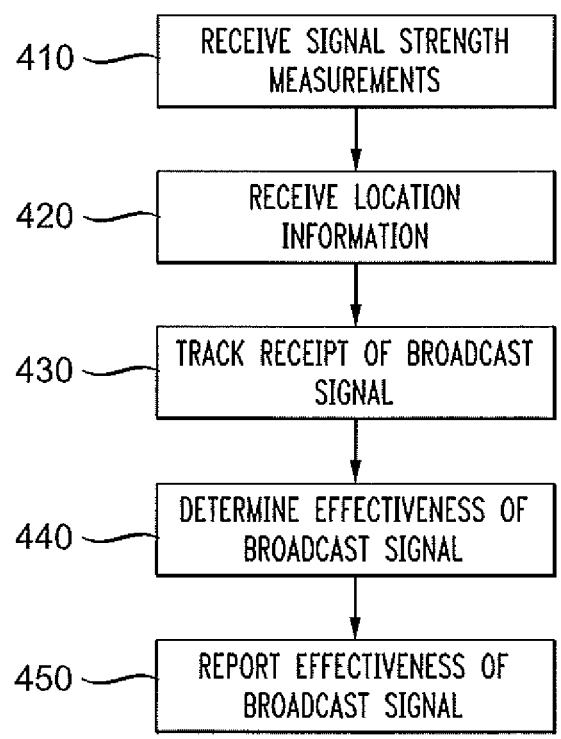
FIG. 4 illustrates a method for tracking the receipt and determining the effectiveness of radio broadcast signal according to an exemplary embodiment.

FIG. 4 illustrates a method for tracking receipt and determining effectiveness of a radio broadcast signal according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

At step 410, signal strength measurements are received, e.g., at the broadcast tracker 160, from a plurality of mobile communication devices. The signal strength measurement signals indicate received signal strengths of the radio broadcast signal received via a communication channel at the mobile communication devices 110 over a particular time period. At step 420, location information is received, e.g., at the broadcast tracker 160 from the mobile communication devices 110 indicating locations of the mobile communication devices within a geographic area from which the signal strength measurements signals are received over the particular time period. Receipt of the radio broadcast signal by the mobile communication devices 110 at the locations within the geographic area is tracked by the broadcast tracker 160 over the particular time period based on the received signal strength measurement signals and the received location information at step 430. At step 440, the broadcast tracker 160 determines effectiveness of the radio broadcast signal with respect to receipt of the radio broadcast signal by the plurality of mobile communication devices within the geographic area over the particular time period. Effectiveness of the radio broadcast signal may be determined by, e.g., determining a density of mobile communication devices within the geographic area that receive the radio broadcast signal within the particular time period. Effectiveness may also be determined by, e.g., determining a duration of time within the particular time period that the mobile communication devices 110 receive the broadcast radio signal. Effectiveness of the radio broadcast signal may be reported to a content source 150 at step 450.

According to exemplary embodiments, tracking receipt and determining effectiveness of radio broadcast signals provides benefits to broadcast content providers, such as advertisers and radio/television broadcast stations. With information regarding the listenership of radio broadcasts, content providers are better able to target content to their audiences. In particular, advertisers are better able to target broadcast advertisements to those listeners who are likely to be interested in buying the products or services being advertised. Providers of augmented content, such as news organizations, may benefit by being better able to target their content to listeners in a cost-efficient manner for both the providers of the augmented content and their broadcast station partners.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for tracking receipt of a radio broadcast signal having advertising information, comprising:

transmitting, to a mobile communication device, time information indicating a time period when the radio broadcast signal having the advertising information will be sent by a radio station or a television station;

receiving, from the mobile communication device, by a broadcast tracking device, a signal strength measurement signal indicating signal strength of the radio broadcast signal received, by the mobile communication device, via a communication channel over a particular time period;

receiving, from the mobile communication device, by the broadcast tracking device location, location information indicating a location, within a geographic area, of the mobile communication device over the particular time period, the location information being calculated by the mobile communication device without using information related to the radio broadcasting signal;

receiving, from the mobile communication device, transaction information associated with the advertisement information in the radio broadcast signal; and tracking, by the broadcast tracking device, the signal strength of the radio broadcast signal received within the geographic area at the mobile communication device over the particular time period, based on the signal strength measurement signal received, the location information received, and the transaction information received.

2. The method of claim 1, further comprising determining an effectiveness of the radio broadcast signal with respect to receipt of the radio broadcast signal by a plurality of mobile communication devices within the geographic area over the particular time period.

3. The method of claim 2, wherein determining the effectiveness of the radio broadcast signal comprises determining, based on the received signal strength measurements and the received location information, a density of mobile communication devices within the geographic area that receive the radio broadcast signal within the particular time period.

4. The method of claim 2, wherein determining the effectiveness of the radio broadcast radio signal comprises determining, based on the received signal strength measurement signals, a duration of time within the particular time period that the mobile communication devices receive the radio broadcast signal.

5. The method of claim 2, further comprising reporting the determined effectiveness of the radio broadcast signal to a source of radio broadcast content.

6. The method of claim 5, further comprising providing billing information for the source of the broadcast radio content based on the determined effectiveness of the radio broadcast signal.

7. The method of claim 1, wherein the radio broadcast signal is received by the mobile communication device at a frequency outside a cellular radio frequency range.

8. The method of claim 7, wherein the mobile communication device also receives and transmits radio signals within the cellular radio frequency range, and the receipt of the radio broadcast signal outside of the cellular radio frequency range is tracked independently of communication within the cellular radio frequency range.

9. The method of claim 1, wherein the radio broadcast signal includes an emergency broadcast signal.

10. A system for tracking receipt of a radio broadcast signal having advertising information, comprising:
    a processor; and
    a memory having instructions stored thereon which, when executed by the processor, cause the processor to perform operations comprising:
        transmitting, to a mobile communication device, time information indicating a time period when the radio broadcast signal having advertising information will be sent by a radio station or a television station;
        receiving, from the mobile communication device, a signal strength measurement signal indicating signal strength of the radio broadcast signal received, at the mobile communication device, via a communication channel over a particular time period;
        receiving, from the mobile communication device, location information indicating a location of the mobile communication device, within a geographic area over the particular time period, the location information being calculated by the mobile communication device without using information related to the radio broadcasting signal;
        receiving, from the mobile communication device, transaction information associated with the advertising information in the radio broadcast signal; and
        tracking received signal strength of the radio broadcast signal, within the geographic area over the particular time period based on the received signal strength measurement signal, the received location information, and the received transaction information.

11. The system of claim 10, wherein the processor determines an effectiveness of the radio broadcast signal with respect to receipt of the radio broadcast signal by a plurality of mobile communication devices within the geographic area over the particular time period.

12. The system of claim 11, wherein the processor determines the effectiveness of the radio broadcast signal by determining, based on the received signal strength measurements and the received location information, a density of mobile communication devices within the geographic area that receive the radio broadcast signal within the particular time period.

13. The system of claim 11, wherein the processor determines the effectiveness of the radio broadcast radio signal by determining, based on the received signal strength measurement signals, a duration of time within the particular time period that the mobile communication devices receive the radio broadcast signal.

14. The system of claim 11, wherein the processor reports the determined effectiveness of the radio broadcast signal to a source of radio broadcast content.

15. The system of claim 10, wherein the radio broadcast signal is received by the mobile communication device at a frequency outside a cellular radio frequency range, the mobile communication device also receives and transmits radio signals within the cellular radio frequency range, and the receipt of the radio broadcast signal outside of the cellular radio frequency range is tracked independently of communication within the cellular radio frequency range.

16. A computer program product including a non-transitory storage medium upon which instructions are recorded that, when executed by a processor perform operations comprising:
    transmitting, to a mobile communication device, time information indicating a time period when the radio broadcast signal with advertising information will be sent by a radio station or a television station;
    receiving, from the mobile communication device, a signal strength measurement signal indicating signal strength of the radio broadcast signal, received at the mobile communication device, via a communication channel over a particular time period;
    receiving, from the mobile communication device, location information indicating a location of the mobile communication device within a geographic area over the particular time period, the location information being calculated by the mobile communication device without using information related to the radio broadcasting signal;
    receiving, from the mobile communication device, transaction information associated with the advertising information in the radio broadcast signal; and
    tracking received signal strength of the radio broadcast signal, within the geographic area over the particular time period based on the received signal strength measurement signal, the received location information, and the received transaction information.

17. The computer program product of claim 16, wherein the method further comprises determining an effectiveness of the radio broadcast signal with respect to receipt of the radio broadcast signal by a plurality of mobile communication devices within the geographic area over the particular time period.

18. The computer program product of claim 17, wherein determining the effectiveness of the radio broadcast signal comprises determining, based on the received signal strength measurements and the received location information, a density of mobile communication devices within the geographic area that receive the radio broadcast signal within the particular time period.

19. The computer program product of claim 17, wherein determining the effectiveness of the radio broadcast radio signal comprises determining, based on the received signal strength measurement signals, a duration of time within the particular time period that the mobile communication devices receive the radio broadcast signal.

20. The computer program product of claim 16, wherein the radio broadcast signal is received by the mobile communication device at a frequency outside a cellular radio frequency range, the mobile communication device also received and transmits radio signals within the cellular radio frequency range, and the receipt of the radio broadcast signal outside of the cellular radio frequency range is tracked independently of communication within the cellular radio frequency range.

\* \* \* \* \*